F. Y. BOWLAND.
FRONT WHEEL CENTERING DEVICE.
APPLICATION FILED MAR. 17, 1914. RENEWED JULY 27, 1915.
1,154,908.
Patented Sept. 28, 1915.
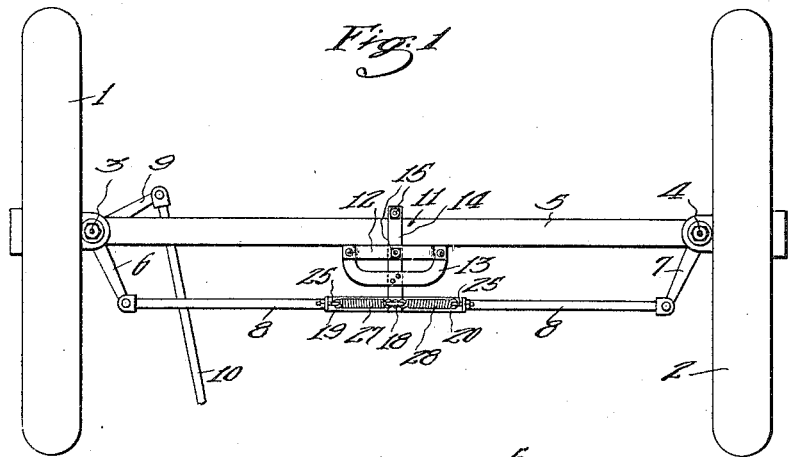
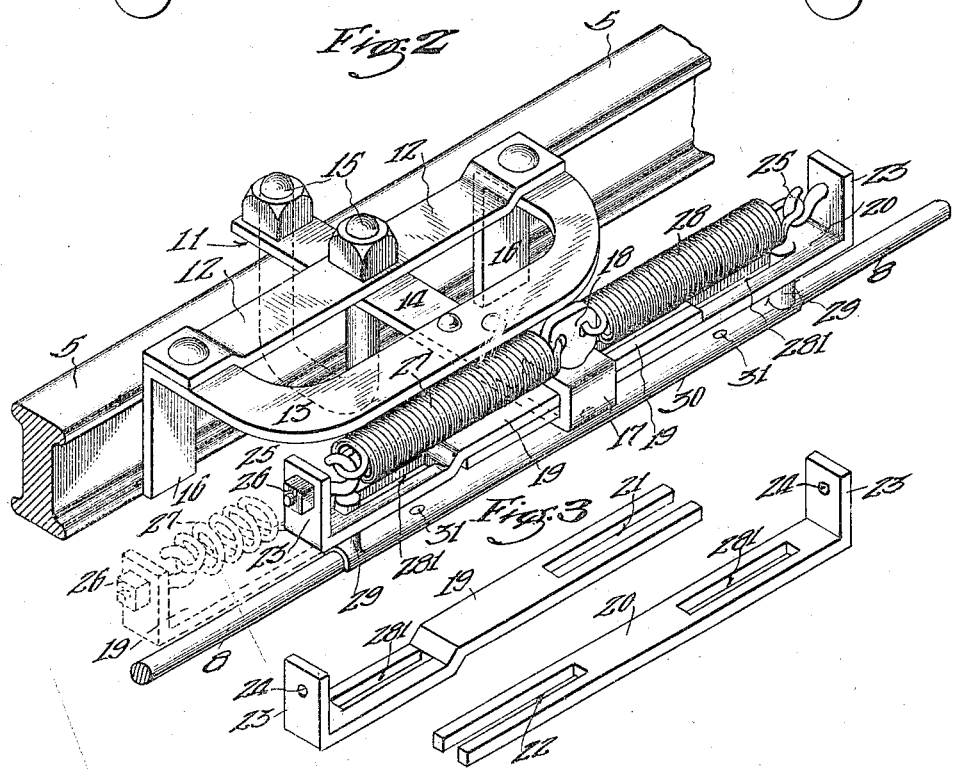
Witnesses:
Isabel Hall.
Fred. W. Harris
Inventor,
Frank Y. Bowland,
by Townsend & Graham
his Attys.

UNITED STATES PATENT OFFICE.

FRANK Y. BOWLAND, OF PASADENA, CALIFORNIA, ASSIGNOR TO F. R. MEADORS, OF PASADENA, CALIFORNIA.

FRONT-WHEEL-CENTERING DEVICE.

1,154,908.  Specification of Letters Patent.  Patented Sept. 28, 1915.

Application filed March 17, 1914, Serial No. 825,411. Renewed July 27, 1915. Serial No. 42,238.

*To all whom it may concern:*

Be it known that I, FRANK Y. BOWLAND, a citizen of the United States, residing at Pasadena, in the county of Los Angeles, State of California, have invented a new and useful Front-Wheel-Centering Device, of which the following is a specification.

The invention relates to automobiles, and its principal object is to provide an attachment for automobiles for the purpose of holding the front wheels in the central position so that the automobile will run in a straight line and to draw these wheels back to the central position when they are thrown from this position for any reason.

Other objects and advantages will appear hereinafter.

In the drawing, which is for illustrative purposes only: Figure 1 is a plan view of the front axle and wheels of an automobile. Fig. 2 is a perspective view of a portion of the automobile and of the invention applied thereto. Fig. 3 is a perspective view of two of the members shown in Fig. 2.

The form of automobile construction as shown in Fig. 1 is that commonly used on the majority of automobiles now in use.

In the drawing, 1 and 2 are the forward wheels which are pivoted at 3 and 4 on the axle 5. Arms 6 and 7 carry a stub axle upon which the wheel turns, an equalizer rod 8 connecting these arms so that the wheels 1 and 2 move together. An arm 9 is secured to the arm 6, and a rod 10 serves to move the arm 9 to turn the wheels about the pivots 3 and 4, the rod 10 extending to a steering wheel or similar device, not shown.

One form of my wheel centering device is illustrated in Fig. 2. In this drawing a bracket 11 is formed of straps 12, 13, and 14 riveted together as shown, and is secured to the axle 5 by means of a U-shaped bolt 15 which extends downwardly and surrounds the axle and clamps the bracket 11 securely thereon. Projections 16, formed on the strap 13, extend downwardly and serve to render the connection with the axle 5 more rigid. The end of the strap 14 is bent in a U-shape as shown at 17 and a bolt 18 extends downwardly connecting the two members of this U-shaped portion together. Sliding straps 19 and 20 have slots 21 and 22 formed therein, the bolt 18 extending downwardly through these slots. The outer end of the sliding straps 19 and 20 are turned up as shown at 23, and holes 24 are drilled therein for the reception of hooks 25 which are secured by nuts 26. Springs 27 and 28 are secured in holes in the head of the bolt 18 and to the hooks 25 carried on the sliding straps 19 and 20. Slots 281 are also formed in the sliding straps 19 and 20. The ends 29 of a member 30 engage the slots 281, the member 30 being riveted as shown at 31, or otherwise secured to the rod 8.

The method of operation of the invention is as follows: The lever 9 being rotated through the rod 10 from the steering mechanism tends to turn the wheels 1 and 2 and to move the rod 8 to one side or the other of the center position. The projections 29 on the member 30 extend upwardly and engage the slots 281, and one projection 29 slides freely in the slot 281 toward the center of the bracket 11 at the same time that the other end 29 moves away from the center and carries the member 19 with it. This movement of the member 19 into the dotted position shown in Fig. 2 puts a tension on the spring 27 and this tension of the spring 27 tends to draw the member 19 back to the central position whenever the force of the controlling means is released, as for example, when the operator removes his hand from the steering wheel of the automobile. In this event the spring 27 draws the member 19 back to the center position and draws the rod 8 back to the center position by acting on the member 30. If the wheels are turned in the opposite direction a similar action takes place due to the spring 28. The springs 27 and 28 are always under some tension tending to force the members toward the center until the bolt 18 reaches the ends of the slots 21 and 22.

I claim as my invention:

1. A front wheel centering device, adapted to be secured to the front axles of an automobile and to put a spring tension upon the equalizing rod of said automobile whenever said rod is moved from the central position, comprising a bracket secured to said axle and extending over said rod, a bolt secured in said bracket, a pair of springs on either side of said bolt each having one end secured to one side of said bolt, a pair of sliding straps having slots engaging said bolt, hooks connecting the other end of said springs to said straps, and means on said rod for sliding one of said straps and putting tension on one of said springs whenever said rod is moved from its central position.

2. A front wheel centering device, adapted to be secured to the front axle of an automobile and to put a spring tension upon the equalizing rod of said automobile whenever said rod is moved from the central position, comprising a bracket secured to said axle and extending over said rod, a bolt secured in said bracket, a pair of springs on either side of said bolt each having one end secured to one side of said bolt, a pair of sliding straps having slots engaging said bolt, hooks connecting the other end of said springs to said straps, and a member secured to said rod having projections engaging the slots in said sliding straps.

3. A front wheel centering device, adapted to be rigidly secured to the front axle of an automobile and to put a spring tension on the equalizing rod connecting the front wheels whenever said rod is moved from its central position, comprising a bracket made up of flat straps and secured to said axle, one of said straps having one end formed in a U-shape directly over said rod, a bolt passing through holes in each leg of said U-shaped portion, a pair of sliding straps directly over said rod and on either side of said bolt having open slots in one end engaging said bolt, the other end of each strap being turned up, and an intermediate slot formed between said turned up end and said open slot, a pair of tension springs each connecting the bolt with one of said upturned ends, and a member rigidly secured to said rod having a projection on either end thereof which extend up and slide in said intermediate slots.

In testimony whereof, I have hereunto set my hand at Los Angeles, California, this 9th day of March, 1914.

FRANK Y. BOWLAND.

In presence of—
 FORD W. HARRIS,
 FRED A. MANSFIELD.